MOTOR WHOSE MAGNETIC CIRCUIT COMPRISES A THIN LAYER OF HARD MAGNETIC MATERIAL

Filed May 6, 1969

Nov. 10, 1970 G. STCHERBATCHEFF 3,539,845

MOTOR WHOSE MAGNETIC CIRCUIT COMPRISES A THIN LAYER OF HARD MAGNETIC MATERIAL

Filed May 6, 1969

4 Sheets-Sheet 4

United States Patent Office 3,539,845

Patented Nov. 10, 1970

3,539,845

MOTOR WHOSE MAGNETIC CIRCUIT COMPRISES A THIN LAYER OF HARD MAGNETIC MATERIAL

Georges Stcherbatcheff, Paris, France, assignor to Societe de Recherches en Matiere de Micro-Moteurs Electriques SOCREM, Paris, France Filed May 6, 1969, Ser. No. 822,203
Claims priority, application France, May 10, 1968, 151,281
Int. Cl. H02k 21/12
U.S. Cl. 310—46 7 Claims

ABSTRACT OF THE DISCLOSURE

The invention relates to electric motors for clockwork movements and, more particularly, to miniature motors wherein both the current drain and the static torque should be very small.

The instant invention more particularly provides for a motor the rotor of which includes a permanently magnetized thin layer, the stator magnetic flux being transverse to the said layer, whereby the motor static torque is substantially cancelled.

This invention relates to electric motor devices such as: "micromotors" use in particular in clockwork movements, small polarized electromagnets, etc., comprising a magnetic circuit provided with a coil having a reduced space requirement, fed by a low power electric source. The magnetic circuit will be referred to hereinafter as "deformable," as the flux path through the air gap thereof is modified during the operation of the device.

The invention relates more particularly to motor devices of this type, in which the excitation flux generated by a permanent magnet and the flux due to the current which flows through the coil generally follow the same path, the useful part of the flux due to the current going through the magnet and, conversely, the flux produced by the magnet going through the coil.

This type of polarized motor device makes it possible to obtain a good energy efficiency thanks to the permanent excitation provided by the magnet. However, when only a very small number of ampere-turns is available, the polarized motors of prior art are not satisfactory, as the magnet always introduces residual static torques which should be compensated by the effect of the flow of current, in order that the motor may be self-starting under all conditions.

Therefore, it is an object of the present to provide an electric motor device comprising a variable magnetic circuit in which the excitation flux and the flux due to the current flow generally follow the same path, said motor device being adapted for efficient operation with only a minimum current drain, yet having a very small static couple.

It is another object of the invention to provide an electric motor device of the type above referred to wherein the conventional massive magnet is replaced by a thin layer of hard magnetic material with a high coercive field, magnetized in the direction of its thickness, and wherein the magnetic field in the air gap of the magnetic circuit is substantially perpendicular to said layer.

More specifically, the thickness of said "thin layer" A will be determined so that the ratio x of the product $Hc \times L$, $Hc$ being the coercive field and $L$ said thickness, to the product $Br \times e$, $Br$ being the remanent induction and $e$ the dimension of the air-gap, is substantially below unity. The term "thin layer" will designate hereinafter a layer" of hard magnetic material, while the stator comdefinition.

The invention covers essentially, on the one hand, polarized micromotors, in which said ratio is preferably substantially below 1, but higher than 0.1 and, on the other hand, nonpolarized "boosted" motor devices, in which said ratio is preferably below 0.1.

In a polarized micromotor according to the invention, the rotor preferably comprises a magnetic cup-shaped element comprising a circular flange forming a "thin layer" of hard magnetic material, while the stator comprises pole pieces located on either side of this "thin layer," so that the field which they generate is substantially perpendicular to said layer.

These and other objects, as well as the advantages of the invention, will appear clearly as a result of the following description.

Figure 1:
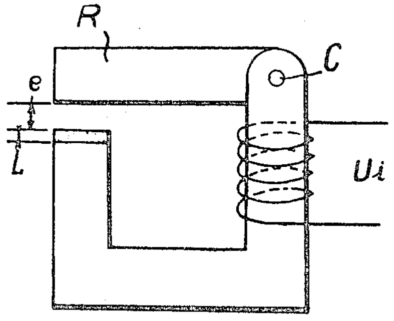
FIG. 1 is a schematic diagram of an elementary variable magnetic circuit according to the invention.

FIG. 1 shows an elementary magnetic circuit comprising an air gap $e$, a layer made of hard magnetic material of thickness $L$ and an excitation coil generating a magnetic potential $Ui$. In such a circuit, the useful part of the flux generated by the coil goes through the magnet and, conversely, the flux generated by the magnet goes through the coil and thus provides a permanent excitation which is favourable to the efficiency of a motor device in which this circuit is an element in a more complex deformable magnetic system.

As will be explained hereinafter, such a motor device will be, for example, a micromotor or a small polarized electromagnet. The movable part in the air gap $e$ is symbolized, in FIG. 1, by a bar B linked around a hinge C, but it is quite evident that, in practice, it can have widely varying shapes, as will appear subsequently.

With the proviso that the magnetic material which comprises layer L has a high coercive field $Hc$, and that there exists a linear relationship, in a wide range of variation, between induction B and field H (which is the case for ferrites and platinum-cobalt alloy for example), it can be shown that there exists, within said magnetic layer a field $$H=Hc\left(1-\frac{B}{Br}\right)$$

$Br$ being the remanent induction.

Let $U_1$ be the magnetic potential provided by the current:

$$HL+U_1=Be$$

which gives:

$$B=\frac{H_cL+U_1}{e+LH_c/Br}$$

If the parameter: $x=H_cL/Br\times e$ is introduced, then $$B=Br\frac{z}{1+x}+\frac{U_1/e}{1+x}$$

is obtained, which gives the magnetic pressures $$P=\frac{B^2}{8\pi}=\frac{1}{8\pi}\left[B^2\frac{x^2}{(1+x)^2}+2\frac{U_1}{e}Br\frac{x}{1+x^2}+\frac{(U_1/e)^2}{(1+x)^2}\right]$$

Two cases can be distinguished: (a) in a polarized system, the third term $$P_2=\frac{(U_1/e)^2}{(1+x)^2}$$

is negligible; the constant term $$Br^2\frac{x^2}{(1+x)^2}$$

due to the magnet will be symbolized by $P_0$ and the term $$2\frac{U_1}{e}Br\frac{x}{(1+x)^2}$$

which is proportional to the current will be symbolized by $P_1$; (b) in a nonpolarized system, $x=0$, $Br=0$, and therefore, only the term $P_2$ remains which varies as $(Ui/e)^2$.

In a clockwise micromotor (polarized system), the following situation applies:

$U_1$ (which is a function of the number of ampere-turns) is practically limited by the size of the coil and by acceptable power values.

It is also described to avoid reducing the air gap $e$ to prohibitive values from the point of view of mechanical tolerances.

As a result of the two data given above, $U_1/e$ is limited. This is the field which would be produced by the current if air gap $e$ were to represent magnetic reluctance only. For example, $U_1/e$ can be of the order of 100 oersted obtained from 1 ampere-turn.

It is necessary that the current produces magnetic pressures which represent a sufficiently high percentage of those due to the magnet so that the motor can be a practical possibility. Indeed, it seems to be impossible to provide a perfect compensation of attractive effect of the magnet. This amounts to a search for a sufficiently high ratio of $$\frac{P_1}{P_0}=\frac{2U_1/e}{Br}\cdot\frac{I}{x}$$

in other words, to choosing a low magnet height L, corresponding to a small $x$.

Figure 2:
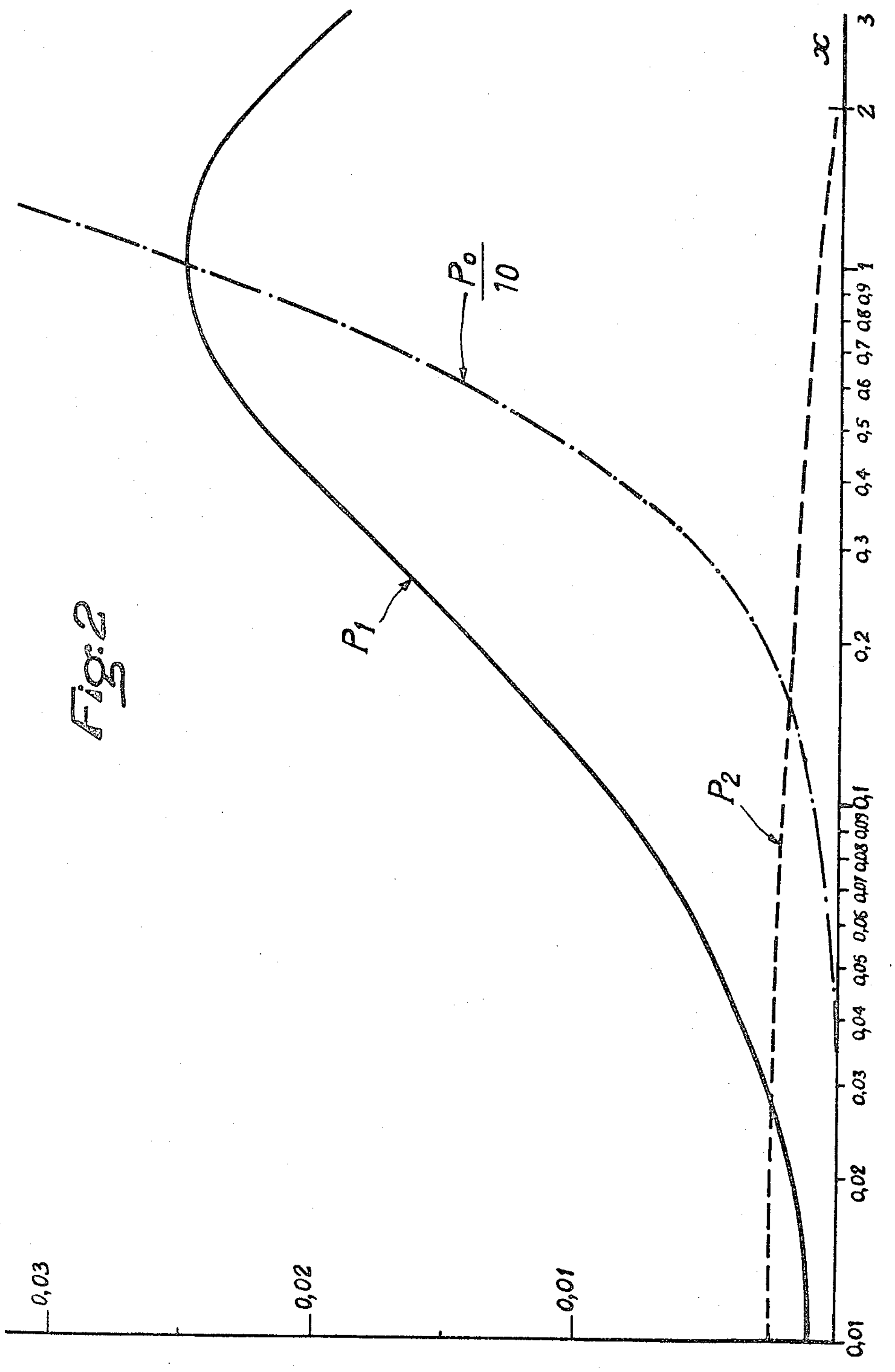
FIG. 2 shows curves designed to illustrate the operation of such a circuit.

Efficiency considerations confirm this approach. FIG. 2 shows, in arbitrary units, the variations, as a function of $x$, of $P_1$ (solid line curve), of $P_0/10$ (hatched line curve) and of $P_2$ (dotted line curve). If the variations of $P_0$ and $P_1$ as a function of $x$ are examined, it can be seen: (a) that $P_1$ is a maximum for $x=1$, which corresponds to the maximum BH product; (b) that, on the other hand, $P_0$ increases uniformly from 0 up to a value of $B^2/8\pi$ which would be obtained with a zero air gap.

As a result, by taking $x$ substantially below unity, an efficiency is maintained (current effect) which remains of the same order of magnitude as the maximum, while $P_0$ takes on values of a much lower order of magnitude. For example, if $x$ goes from 1 to 0.3, $P_1$ decreases by 30% while $P_0$ is reduced in a ratio close to 5. This leads, therefore, to a technology using a "subadapted" magnet which is applied to a polarized system of which an example will be provided subsequently.

The same reasoning can lead to a class of system deriving this time from the nonpolarized motor (whose magnetic circuit is entirely permeable) and which will be termed "boosted nonpolarized" system.

This is the case of certain oscillating motors. On the surface of the active air gap of such a system, there is then deposited a magnetized layer whose thickness will be, for example, still 10 times weaker than in the preceding case (therefore, preferably $x<0.1$); this time, the respective terms $P_1$ and $P_2$ will be of the same order of magnitude and $P_0$ will be of a lower order of magnitude.

By taking, for example $x=0.03$, which, for $Hc/Br$ close to 1, leads to the introduction of a 3 micron layer for an air gap of 0.1 mm., the efficiency can be more than doubled, without the general properties of a nonpolarized system being modified: the static term $P_0$ represents only 16% of the current effect $P_1+P_2$, and its disturbance effect can be considered as secondary. The structure is of course the same and the mode of operation of a nonpolarized system is maintained (i.e., possibility of producting forces of one sign only, but in conformity, this time, with the desired direction of the current).

In the final analysis, this invention consists mainly in providing a magnetic circuit designed to obtain a motor device of the type referred to above, with a thin layer L of hard magnetic material having a high coercive field, magnetized in the direction of its thickness and crossed perpendicularly by the field. This thin layer will replace the permanent massive magnet usually employed in a magnetic circuit of the polarized type, or, in the case of a nonpolarized magnetic circuit, it will be inserted in the air gap of a circuit which does not usually comprise any hard magnetic material (by convention then, this will be said to be a "boosted" nonpolarized magnetic circuit).

The concrete application of this new technique will be explained subsequently by referring to practical embodiments. The purpose of the schematic diagram of FIG. 1 is simply to give an understanding of its value.

It should be recalled that the provision of a micromotor, particularly in the case of clock-making applications, where powers may be of the order of several microwatts only, raises the difficult problem which consists in conciliating the achievement of a torque that is as high as possible with a small number of ampere-turns and the reduction of the static torque or torque at rest. The latter must, indeed, in order that the motor may be self-starting, be overcome by the torque due to the current: however, there is no known practical means, at present, for obtaining the cancellation of the torque at rest.

The curves of FIG. 2 show that the conventional technique of magnetic circuits of the type referred to above, which circuits have, a priori, the advantage of being characterized by simple structures, comprising a small number of parts, does not lead to a satisfactory compromise, since the length L of the massive magnet is in this technique such that $x$ is greater than unity, so that the torque at rest is, in any case, comparatively large.

It often becomes necessary, in the prior art, in order to overcome this difficulty, to completely eliminate the magnetic circuit made of permeable material, but this solution imposes relatively large air lengths which the magnetic flux must cross, and, in the final analysis, it does not make it possible to obtain sufficiently compact devices.

The "thin layer" technique differs from these known techniques in that it makes it possible to considerably reduce the torque at rest without appreciably reducing the torque due to the current. By way of example, for $Br=4000$ gauss and $Hc=4000$ oersteds, $x=0.33$ is obtained for $L=0.10$ mm. in a circuit having a total magnetic reluctance equivalent to an average air-gap of 0.3 mm. The thin layer technique, which corresponds to $x$ substantially lower than 1, is therefore distinctly delineated with respect to the usual massive magnets. This technique is very imple and makes it possible to provide these motor devices requiring such a circuit, at a greatly reduced scale; even with a coil of small dimensions and a small number of amepere-turns, it makes it possible, indeed, to maintain an acceptable proportion between the induction due to the current and induction due to the magnet.

Figure 3:
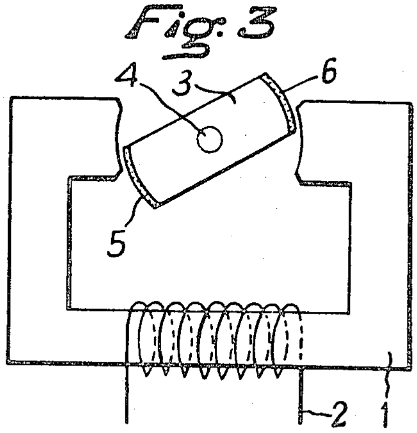
FIG. 3 shows a "boosted" nonpolarized motor according to the invention.

FIG. 3 illustrates the application of this technique with a view to obtaining a motor device of the nonpolarized type currently used in clock-making.

This involves an oscillating motor which comprises essentially a stator 1 provided with a coil 2 and a part 3 made of soft magnetic material which oscillates in the air gap of the stator around an axis 4. A contact, not shown, integral with part 3, cuts the energization of the coil (which is carried out by means of pulses of constant sign) as soon as part 3 occupies its equilibrium position in the air gap, while a coil spring, not shown, destroys this equilibrium as soon as the energization has been cut out. As soon as the pendulum has moved away from the equilibrium position, the energization is restored, so that the magnetic attractive force exerted in the air gap returns the pendulum to an equilibrium position and so on.

The introduction, according to the invention, of thin layers 5 and 6 made of hard magnetized magnetic material on the active faces of part 3 results in the production of an induction in the same direction as that produced by the current. This induction results in a substantial increase of the torque due to the current, which makes it possible to reduce the size of the assembly. A certain static torque is also introduced by the thin layers, but, as shown by the curves in FIG. 2, the static torque thus introduced will be practically negligible if a very low value of $x$ is chosen (substantially below 0.1).

By way of example, the thickness of layers 5 and 6 will be such that $x=0.03$, corresponding, for example, as indicated above, to a thickness of 3 microns for an air gap of 0.1 mm. In this example, it was explained that the efficiency will be doubled with the appearance of static forces corresponding to only 16% of the forces due to the current.

The following figures illustrate the application of the thin layer technique with a view to obtaining a micromotor a multipolar rotating magnet.

Figure 4:
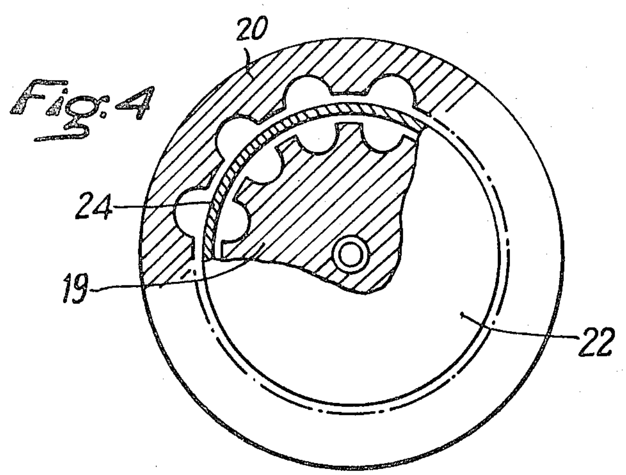
FIGS. 4 and 5 show schematically a first embodiment of a homopolar micromotor according to the invention.
Figure 5:
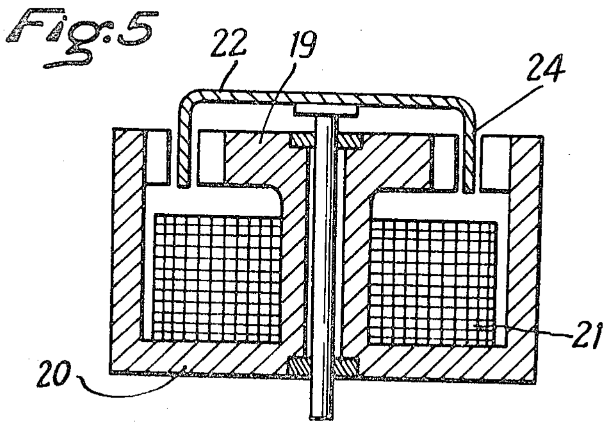

FIGS. 4 and 5 show schematically a homopolar micromotor.

The stator consists of a core 18 terminated by two pole shoes 19 and 20 provided with salient stator poles or "teeth" and respectively positively and negatively polarized by the current which passes through a coil 21. It is seen in FIG. 6 that the teeth of the two pole shoes have the same spacing and are arranged respectively facing each other.

The rotor consists of a cup-shaped part made of platinum-cobalt alloy comprising a plane face 22 integral with an axis 23 supported by bearings 18_a_–18_b_ mounted in core 18 and a cylindrical wall 24.

The thin layer 24 is magnetized radially with alternating positive and negative polarities at the same pitch as the stator poles. The thickness of this wall will also be determined so that $x$ ranges from 0.1 to 1.

Figure 6:
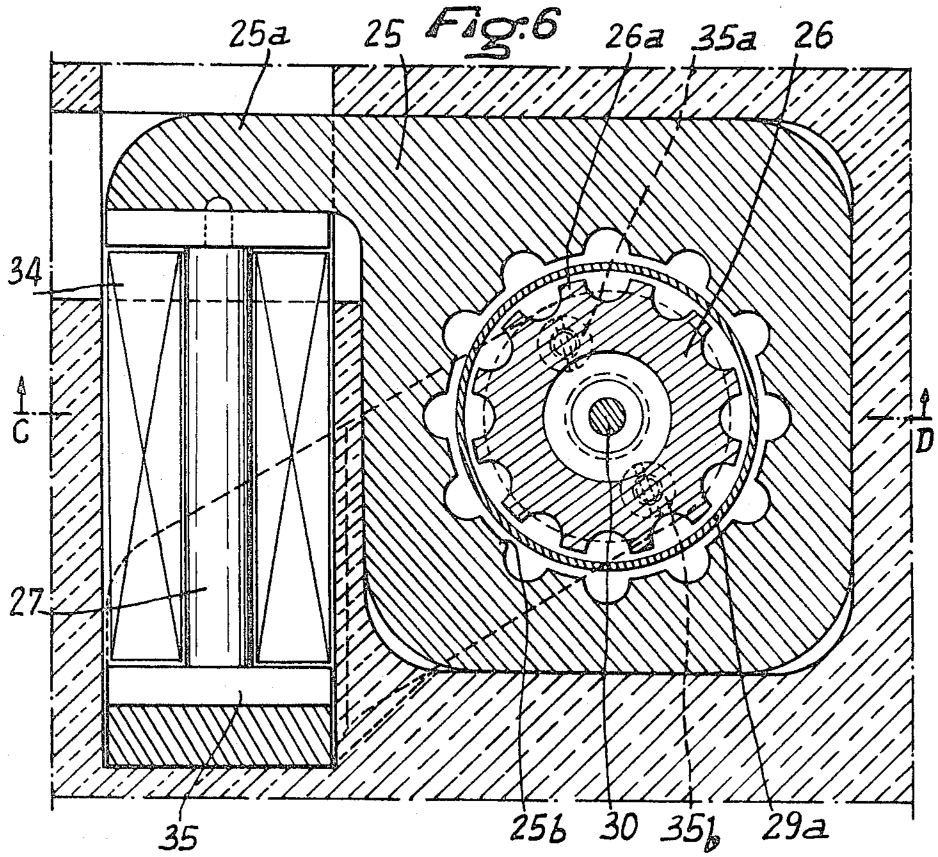
FIGS. 6 to 10 show a varying embodiment more particularly intended for watches.
Figure 7:
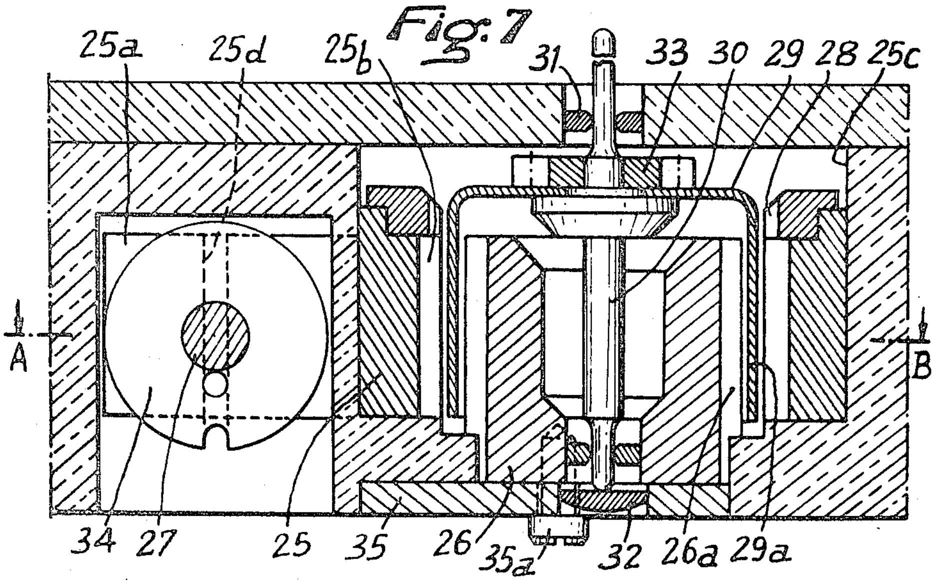

The micromotor shown in FIGS. 6 and 7 is particularly designed to act as a watch motor, and to this effect, its magnetic circuit is flat-shaped. It comprises a stator consisting of parts 25–26–27 made of permeable magnetic material housed in a massive brass body 28, and a rotor consisting essentially of a cup-shaped part 29 made of platinum-cobalt magnetic alloy. This cup is mounted on an axis 30 supported by pivots 31–32 and drives a pinion 33 (FIG. 7) which constitutes an intake of motion.

Massive part 25 is cut out, as can be seen in FIG. 6, so as to comprise a part 25_a_, provided with a slit 25_d_, which receives the upper end of the core comprising part 27, and two sets of salient poles 25_b_ and 25_c_ (the latter is shown only in FIG. 7). Part 26 has the general shape of a sleeve and is provided with a set of salient poles 26_a_ whose teeth are arranged facing that of set 25_b_. Cylindrical part 29_a_ of bell 29 is housed in the air gap defined by these two set of poles.

Core 27 carries a coil 34 and its lower end is engaged in a part 35 shaped at right angles. This part, made of permeable magnetic material, links it to part 26, which is clamped by means of screws 35_a_, 35_b_, so that a closed magnetic circuit has been set up comprising a thin layer of the type referred to above, consisting of the cylindrical part 29_a_ of cup 29, radially magnetized with alternating polarities having the same pitch as the set of poles

25_b_ and 26_a_. It is important to note that the magnetic field induced by the stator crosses this cup in purely radial directions, so that the total length L of the portion of the magnet included in each elementary path of the flux just amounts to the thickness of the magnet. This would of course not be the case if this elementary path were crossing the magnet twice, or further if it were to comprise nonradial parts in the very thickness of the magnet, and L could then be equal, for example to a 10 times the thickness of the magnet.

The homopolar arrangement of the circuit, or, more generally, any arrangement of the circuit which comprises the presence of pole pieces of opposite signs located on either side of a thin layer of hard magnetic material so that the field which they generate is substantially perpendicular to said thin layer, thus provides a minimum length L, which alone makes it possible, in practice, to obtain the optimum values of the parameter $x$ defined hereinunder. Indeed, it is not possible to increase the air gap $e$ without reducing the efficiency of the magnetic circuit, so that, in order for $x$ to be smaller than 1, it is necessary to reduce L to a sufficient extent.

The thickness of layer 29_a_ ranges, for example, from 0.05 to 0.2 mm.

The set of poles 25_c_, which affects a short length only of the air gap, has a "frequency" (i.e., number of poles) which is double that of the sets 25_b_ and 26_a_.

The motor shown in FIGS. 6 and 7, due to the symmetry of revolution of its structure, at the level of the air gap around the axis of core 30, has only a very small residual static torque, the static forces of radial attraction, already very weak for the reasons exposed by referring to FIGS. 1 and 2, substantially compensating each other.

Applicant has been able to show that the motor of FIGS. 6 and 7 can operate in a correct step by step manner with pulses of alternate sign provided the portion of the "double frequency" pole set is of the correct size. This dimensioning will be provided while taking into account the indications given in patent application Ser. No.495,642, filed in U.S.A. on Oct., 13, 1965, in the name of Georges Stcherbatcheff, for: "Electric Motor With a Bridge-Type Magnetic Circuit," i.e., the "double frequency" set of poles will be dimensioned so as to introduce a corrective torque such that, for each position of the rotor in which the torque due to the current cancels out, there will correspond a maximum torque at rest of a given direction.

The motor of FIGS. 6 and 7 may also be designed to be fed by pulses of constant sign. It is then necessary that the magnetization of the magnetic circuit comprises an asymmetry which will introduce therein a permanent flux. The running of the rotor for a half-step then is effected under the influence of the current, whereas the following half-step is run under the influence of the residual torque created by the permanent flux.

This asymmetry is advantageously obtained by superimposing, on the alternating magnetization of the rotor, a uniform magnetizing component, which amounts to giving a predominant role to poles of a given sign. It should be emphasized that the thin magnet 29, which constitutes the rotor, is well suited to the recording of a precise and reproducible magnetization law.

This recording is carried out by causing the various points of the rotor to pass in front of the pole pieces of a magnetizing device, these pole pieces having small active surfaces and by varying the energization current of said magnetizing device in accordance with a predetermined law.

It should be noted that in order for the "double frequency" pole set to introduce a suitable corrective torque, it is essential that the torque at rest which is associated with the base structure of the motor (i.e., not taking into account this corrective couple) be as small as possible. In practice, this result is obtained, on the one hand, through the reduction of L associated with the thin layer homopolar structure, and on the other hand, through recording of a suitable magnetizing law in this thin layer, and finally through a particular shape of the pole pieces of the stator.

In practice, indeed, the stator will be provided with rounded teeth having a determined curvature so that the current will produce an induction in the magnet varying according to a purely sinusoidal law.

These various measures cooperate finally in providing a correct step by step operation with pulses of alternate or even constant sign.

The detailed views below lead to a better understanding of the structure of the motor of FIG. 6 and 7.

Figure 8:
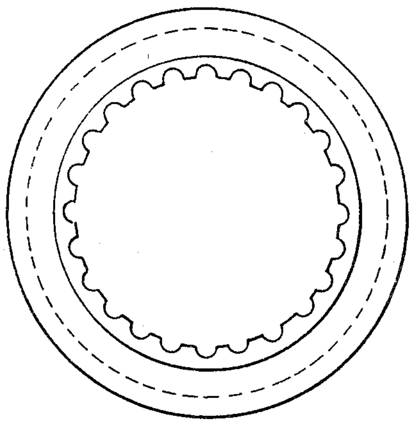

FIG. 8 is a view from above of the double frequency wheel 25*c* of FIG. 7, which shows the salient pole pieces or teeth it comprises.

Figure 9:
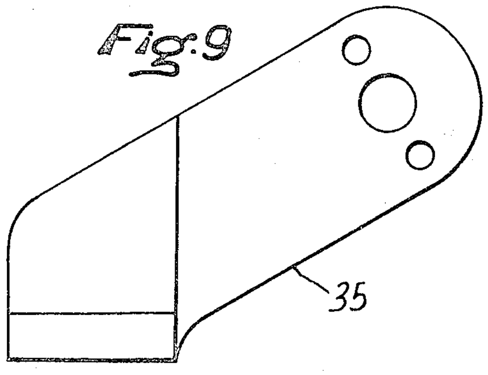
Figure 10:
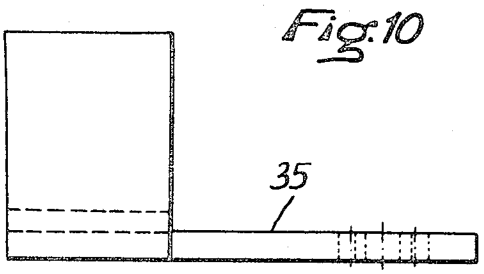

FIGS. 9 and 10 are respectively views from above and in elevation of the base part 35 of FIG. 6, which lead to a better understanding of its shape.

Figure 11:
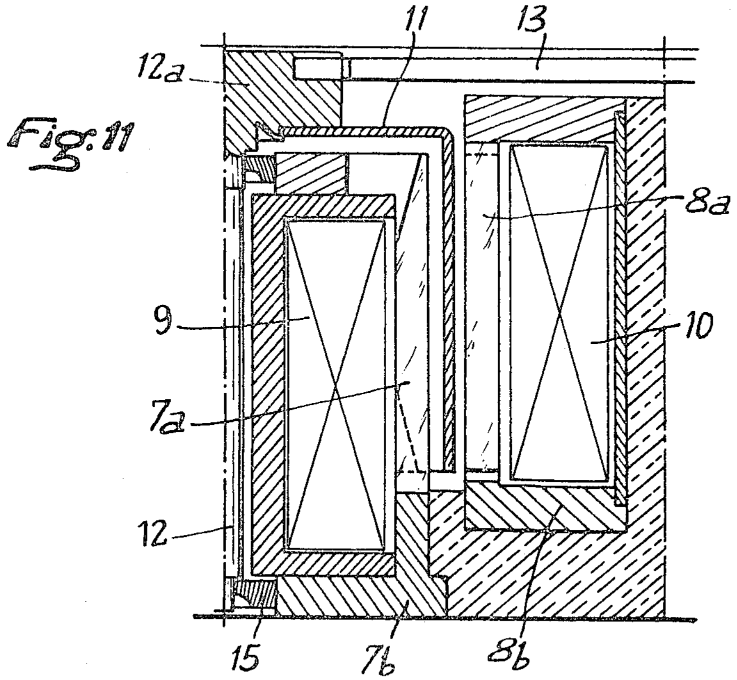
FIG. 11 is a schematic view of a micromotor according to another embodiment comprising two magnetic circuits with intertwined poles.

FIG. 11 shows very schematically the half cross-section of a varying embodiment comprising two autonomous magnetic circuits 7*a*–7*b* and 8*a*–8*b*, with intertwined poles and two coils 9 and 10.

The motor of FIG. 11 can either be operated with a two-phase current, or be used in an assembly which employs a so-called "measuring" coil (this will refer to coil 10) in addition to the normal driving coil (9). Such an assembly has been described, for example, in U.S. patent application Ser. No. 791,330, filed on Jan. 15, 1969, in the name of Georges Stcherbatcheff for: "Clockwork Movement Caused by a Rotary Stepping Electric Motor Having Two Motive Phases Succeeding One Another in Time."

The rotor consists of a thin cup-shaped part 11 made of hard magnetic material, integral with a hub comprising an axis 12 and a pinion 12*a* which engages an intake of motion 13.

Axis 12 is mounted on a pivoting device on stones 14–15. Each of the two circuits of the stator comprises an upper part (7*a* or 8*a*) and a lower part (7*b* or 8*b*), and the poles of the upper part intertwine with those of the lower corresponding part in a way analogous to the teeth of two overlapping combs. Such an arrangement is well known per se and for this reason, the schematic representation of FIG. 11 has been deemed sufficient. It should be noted that even in this nonhomopolar embodiment, the magnetic field induced by the stator crosses the rotor in a purely radial manner.

It is self-evident that various modifications can be introduced into the devices described and shown without departing from the spirit and scope of the invention, as defined in the appended claims.

What I claim is:

1. An electric motor device comprising at least one variable magnetic circuit having an air gap and an electromagnetic coil; current supply means for energizing the coil and causing the coil to generate a magnetic flux; permanent magnet means located in the air gap so as to be crossed by the said magnetic flux and to generate a further magnetic flux which crosses the coil, said permanent magnet means essentially consisting of at least one layer of hard magnetic material magnetized in the direction of its thickness, characterized, in combination, in that said thickness has a value L such that the ratio $x$ of the product $Hc \times L$, Hc being the coercive field of said permanent magnet means, to the product $Br \times e$, Br being the remanent induction and $e$ the dimension of the air gap, is substantially below unity, and in that the said magnetic flux is substantially perpendicular to said layer.

2. An electric motor device as claimed in claim 1, wherein said variable magnetic circuit includes a rotor and a stator, said stator having two pole pieces and said rotor having two active ends, said electromagnetic coil being wound around said stator, means for rotatively mounting said rotor for cooperation of the respective active ends of the rotor with the respective pole pieces of the stator, characterized by the said layer being deposited on at least one of the said active ends and having a thickness such that $x$ is smaller than 0.1.

3. A multipolar micromotor as claimed in claim 1, wherein said magnetic circuit includes a rotor and a stator, characterized in that the rotor comprises at least one tubular portion made of hard magnetic material, said portion forming a radially magnetized layer with a number of substantially equispaced magnetized regions of alternate polarities, of a thickness such that the ratio $x$ ranges from 0.1 and a value below unity, the stator comprising a corresponding number of substantially equispaced pole pieces located on each side of the said layer, so that the field which generated from said pole pieces is substantially perpendicular to said layer.

4. A multipolar micromotor as claimed in claim 3, wherein the said rotor essentially consists of a cup-shaped part having a cylindrical flange which forms the said radially magnetized layer, the said pole pieces forming first and second sets respectively located on each side of the said magnetized layer, the pole pieces of the first set being of negative polarity and the pole pieces of the second set being of positive polarity.

5. A micromotor as claimed in claim 4, in which the stator comprises a further set of substantially equispaced pole pieces, said further set having twice the number of the pole pieces located on each side of the said layer.

6. A micromotor as claimed in claim 5, in which the pole pieces of the stator have a rounded shape, with a curvature determined such that the current passing through the coil generates an induction which varies according to a purely sinusoidal law.

7. A micromotor as claimed in claim 3, in which said layer is magnetized so as further to comprise a uniform component of magnetization.

References Cited

UNITED STATES PATENTS

| | | | |
|---|---|---|---|
| 1,884,115 | 10/1932 | Morrill. | |
| 2,183,404 | 12/1939 | Morrill. | |
| 2,547,599 | 4/1951 | Roters | 318—166 |
| 3,068,374 | 12/1962 | Bekey | 310—162 |
| 3,068,373 | 12/1962 | Bekey | 310—162 |
| 3,261,996 | 7/1966 | Fawzy | 310—162 X |

DONOVAN F. DUGGAN, Primary Examiner

U.S. Cl. X.R.

58—23; 310—36, 156